(12) United States Patent
Yamamoto (10) Patent No.: US 10,976,332 B2
(45) Date of Patent: Apr. 13, 2021

(54) RECEPTACLE CARRIER UNIT AND AUTOMATED ANALYZER

(71) Applicant: JEOL Ltd., Tokyo (JP)

(72) Inventor: Hideaki Yamamoto, Tokyo (JP)

(73) Assignee: JEOL Ltd., Tokyo (JP)

( * ) Notice: Subject to any disclaimer, the term of this patent is extended or adjusted under 35 U.S.C. 154(b) by 223 days.

(21) Appl. No.: 16/239,959

(22) Filed: Jan. 4, 2019

(65) Prior Publication Data

US 2019/0219605 A1    Jul. 18, 2019

(30) Foreign Application Priority Data

Jan. 17, 2018 (JP) .............................. JP2018-005939

(51) Int. Cl.
| | |
|---|---|
| *G01N 35/04* | (2006.01) |
| *G01N 35/10* | (2006.01) |
| *G01N 35/02* | (2006.01) |
| *B01L 9/06* | (2006.01) |
| *G01N 35/00* | (2006.01) |
| *B01L 7/02* | (2006.01) |

(52) U.S. Cl.
CPC ............... *G01N 35/04* (2013.01); *B01L 7/02* (2013.01); *B01L 9/06* (2013.01); *G01N 35/025* (2013.01); *G01N 35/1065* (2013.01); *B01L 2200/147* (2013.01); *B01L 2200/16* (2013.01); *B01L 2300/04* (2013.01); *B01L 2300/1822* (2013.01); *G01N 2035/00435* (2013.01); *G01N 2035/00445* (2013.01); *G01N 2035/0441* (2013.01); *G01N 2035/0443* (2013.01); *G01N 2035/0453* (2013.01); *G01N 2035/0475* (2013.01); *G01N 2035/1032* (2013.01); *G01N 2035/1076* (2013.01)

(58) Field of Classification Search
CPC .. B01L 2300/1822; B01L 7/5255; B01L 7/54; G01N 2035/00435; G01N 2035/00445; G01N 2035/00346; G01N 2035/00425
See application file for complete search history.

(56) References Cited

U.S. PATENT DOCUMENTS

| | | | | |
|---|---|---|---|---|
| 5,244,266 A | * | 9/1993 | Maldanis | ................ G07F 11/54 |
| | | | | 312/116 |
| 2013/0019695 A1 | * | 1/2013 | Shreve | ...................... B01L 7/02 |
| | | | | 73/863.01 |

(Continued)

FOREIGN PATENT DOCUMENTS

| | | | |
|---|---|---|---|
| JP | 2012137329 A | * | 7/2012 |
| JP | 2012137329 A | | 7/2012 |

*Primary Examiner* — Jill A Warden
*Assistant Examiner* — John McGuirk
(74) *Attorney, Agent, or Firm* — The Webb Law Firm (57) ABSTRACT

There is provided a receptacle carrier unit and automated analyzer capable of suppressing generation of temperature nonuniformities among liquid aliquots received in plural receptacles without increasing the parts count. The receptacle carrier unit has a turntable, a turntable drive, a cool box, a cooling portion, and a control section. The control section controls the turntable drive, based on the number and installation locations of the receptacles installed in the cool box and on temperature distribution information, to homogenize the effects that the individual receptacles receive from the cool box.

4 Claims, 7 Drawing Sheets

(56) References Cited

U.S. PATENT DOCUMENTS

| | | | |
|---|---|---|---|
| 2014/0170734 A1* | 6/2014 | Shoji | B01L 7/5255 |
| | | | 435/286.2 |
| 2015/0203297 A1* | 7/2015 | Manning | F25D 13/06 |
| | | | 700/218 |
| 2017/0268814 A1* | 9/2017 | Sigety | F25D 23/021 |

* cited by examiner

RECEPTACLE CARRIER UNIT AND AUTOMATED ANALYZER

CROSS-REFERENCE TO RELATED APPLICATION

This application claims priority to Japanese Patent Application No. 2018-005939 filed Jan. 17, 2018, the disclosure of which is hereby incorporated in its entirety by reference.

BACKGROUND OF THE INVENTION

Field of the Invention

The present invention relates to receptacle carrier units for accommodating receptacles under cooled conditions. The invention also relates to an automated analyzer equipped with such receptacle carrier units.

Description of Related Art

Automated analyzers are used for tests in various fields such as immunological testing, biochemical testing, and blood transfusion examinations. In such an automated analyzer, multiple analytes are analyzed at the same time. Furthermore, a number of analyte components are analyzed quickly and accurately. In addition, an automated analyzer has receptacle carrier units that accommodate receptacles or containers receiving reagents used for testing and receptacles receiving liquids such as analytes. The receptacle carrier units serve to keep the receptacles under cooled conditions to prevent deterioration of the liquids such as reagents and analytes.

The inner wall of the cool box of each receptacle carrier unit incorporates a refrigerating portion consisting, for example, of a Peltier device to refrigerate the inner space of the cool box.

Furthermore, the receptacle carrier unit has openings permitting liquids stored in receptacles to be pipetted. Additionally, the carrier unit has a transmissive window to allow penetration of light from a barcode reader operating to identify the receptacles. Therefore, the inner space of the cool box has space portions where the openings and transmissive windows are formed, and these space portions rise in temperature. Consequently, there arises temperature difference between these space portions and the other space portions. The amount of heat received from the cool box varies according to the position of installation of a receptacle and so there occurs temperature nonuniformity among different liquid aliquots contained in their respective receptacles.

JP-A-2012-137329 sets forth a technique for eliminating temperature nonuniformity within a cool box by utilizing a structure comprising a cool box body, a cooling section for cooling air inside the cool box body, and a blower section for generating a flow of air that is blown against the inner surface of the cool box body such that the air is circulated inside the cool box body.

However, the technique set forth in JP-A-2012-137329 has the problems that it is necessary to mount the blower section in the cool box body and that the component count of the receptacle carrier unit is increased.

SUMMARY OF THE INVENTION

In view of the foregoing problems, it is an object of the present invention to provide a receptacle carrier unit capable of suppressing generation of nonuniformity in temperature among multiple liquid aliquots accommodated in their respective receptacles without increasing the component count of the carrier unit. It is another object of the invention to provide an automated analyzer using such receptacle carrier units.

A receptacle carrier unit which achieves the foregoing objects of the present invention has a turntable, a turntable drive, a cool box, a cooling portion, and a control section. The turntable has a plurality of receiver portions capable of receiving their respective receptacles under vertical conditions. The turntable is rotatably supported by the turntable drive. The cool box accommodates the turntable. The cooling portion cools the inner space of the cool box. The control section controls the turntable drive. The control section has a temperature distribution memory in which there is stored temperature distribution information indicative of degrees of ease with which the individual installation locations of the receptacles within the cool box are warmed or cooled. The controller controls the turntable drive based on the number and installation locations of receptacles installed in the cool box and on the temperature distribution information such that the effects that the individual receptacles receive from the cool box are homogenized.

An automated analyzer according to the present invention has receptacle carrier units for accommodating receptacles under cooled conditions, a probe adapted to be inserted into and withdrawn from the receptacles accommodated in the carrier units, and a control section. The receptacle carrier units are of the construction described in the above paragraph.

According to the receptacle carrier units and automated analyzer according to the present invention, generation of temperature nonuniformities among liquid aliquots accommodated in their respective receptacles can be suppressed without increasing the component count.

DESCRIPTION OF THE INVENTION

Embodiments of the automated analyzer and receptacle carrier unit of the present invention are described with reference to FIGS. 1-7. In the various figures, identical members are indicated by identical reference numerals.

1. One Embodiment

1-1. Configuration of Automated Analyzer

Figure 1:
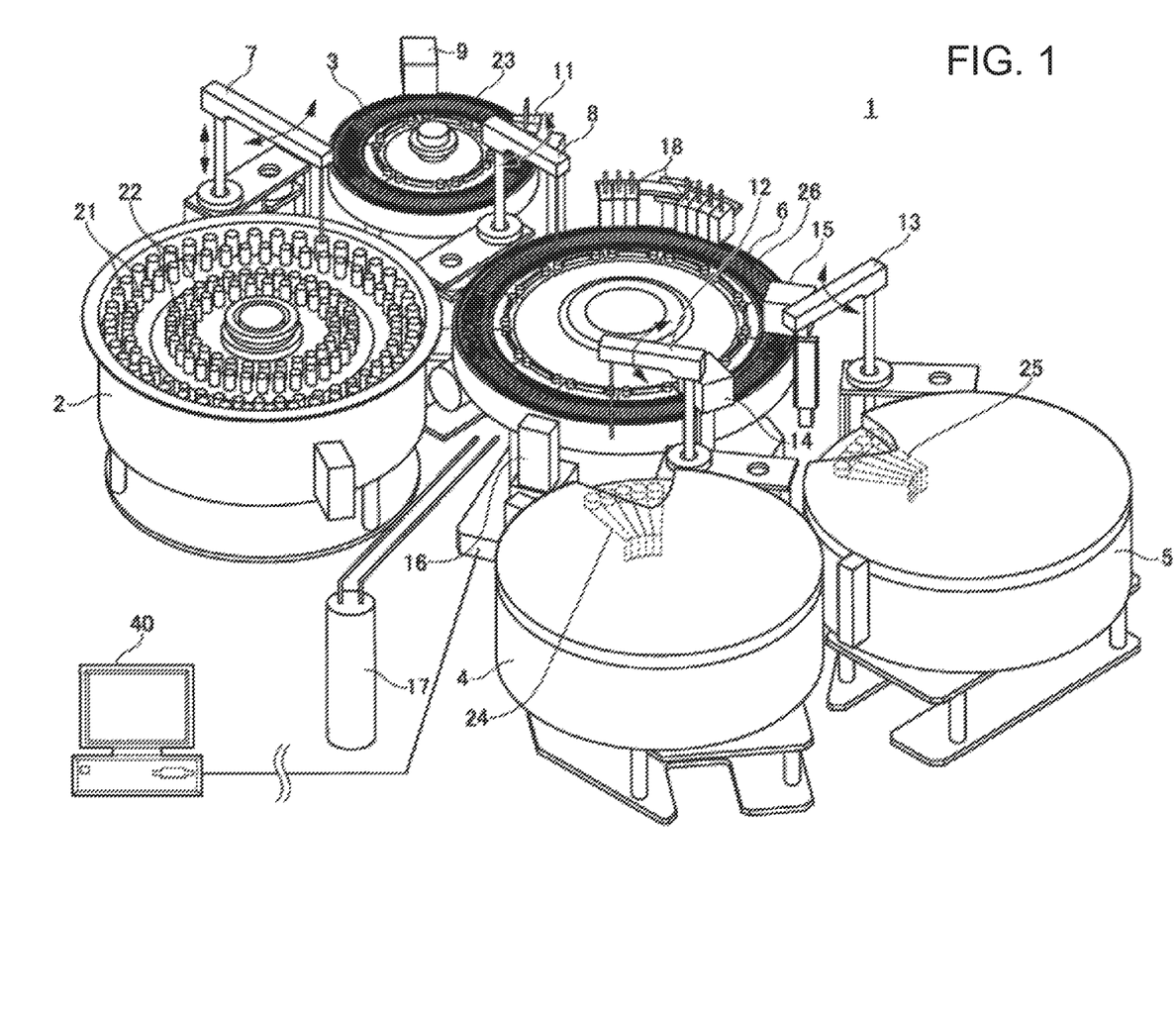
FIG. 1 is a schematic explanatory view of an automated analyzer associated with one embodiment of the present invention.

First, an automated analyzer associated with one embodiment of the present invention is described by referring to FIG. 1, which is a schematic explanatory view of this automated analyzer.

The instrument shown in FIG. 1 is a biochemical analyzer, generally indicated by reference numeral 1, that is one example of the automated analyzer of the present invention. The biochemical analyzer 1 is an instrument for automatically measuring the amount of a certain component contained in each aliquot of a biological sample such as blood or urine.

The biochemical analyzer 1 has a sample turntable 2, a dilution turntable 3, a first reagent receptacle carrier unit 4, a second reagent receptacle carrier unit 5, and a reaction turntable 6. Furthermore, the biochemical analyzer 1 has a sample diluting pipette 7, a sampling pipette 8, a dilution stirrer 9, a dilution receptacle cleaner 11, a first reagent pipette 12, a second reagent pipette 13, a first reaction stirrer 14, a second reaction stirrer 15, a multi-wavelength photometer 16, and a reaction receptacle cleaner 18. In addition, the analyzer 1 has a controller 40 for controlling the whole instrument.

The sample turntable 2 is shaped like a substantially cylindrical container whose one axial end is open. A plurality of analyte receptacles 21 and a plurality of diluent receptacles 22 are held and carried by the sample turntable 2. An analyte (or sample) consisting of blood, urine, or the like is contained in each analyte receptacle 21. A special diluent other than physiological salt solution that is a normal diluent is received in each diluent receptacle 22.

The analyte receptacles 21 are arranged such that two rows are formed at a given spacing radially of the sample turntable 2 and that the analyte receptacles 21 in each row are arranged at given intervals circumferentially of the sample turntable 2.

The diluent receptacles 22 are disposed radially (of the sample turntable 2) inwardly of the rows of the analyte receptacles 21. The diluent receptacles 22 are arranged at given intervals circumferentially of the sample turntable 2 and form two rows at a given spacing radially of the sample turntable 2 in the same manner as for the analyte receptacles 21.

The arrangement of the analyte receptacles 21 and the arrangement of the diluent receptacles 22 are not restricted to two rows. For example, each arrangement may be made up of one row. In addition, each arrangement may be made up of three or more rows at intervals radially of the sample turntable 2.

The sample turntable 2 is supported so that it can be rotated circumferentially by a drive mechanism (not shown). Specifically, the turntable 2 is rotated in steps at a given speed by the drive mechanism (not shown) such that the turntable 2 rotates through a given angular range in one step. The dilution turntable 3 is disposed adjacent to the sample turntable 2.

Each of the dilution turntable 3 and reaction turntable 6 is shaped like a substantially cylindrical container whose one axial end is open, in the same manner as for the sample turntable 2. The dilution turntable 3 and reaction turntable 6 are made to make angular rotational movements circumferentially at given speeds by drive mechanisms (not shown). The reaction turntable 6 is so set that its one step (one angular rotational motion) is more than one-half revolution.

A plurality of dilution receptacles 23 is held and carried on the dilution turntable 3 and arranged circumferentially of the dilution turntable 3. Diluted analyte is drawn from the analyte receptacles 21 arranged on the sample turntable 2 and is received in the dilution receptacles 23.

A plurality of first reagent receptacles 24 is accommodated in the first reagent receptacle carrier unit 4 being one example of receptacle carrier unit, and are arranged circumferentially of the carrier unit 4. A plurality of second reagent receptacles 25 is contained in the second reagent receptacle carrier unit 5 being another example of receptacle carrier unit, and are arranged circumferentially of the carrier unit 5. A first condensed reagent is received in the first reagent receptacles 24. A second condensed reagent is received in the second reagent receptacles 25.

The first reagent receptacle carrier unit 4, first reagent receptacles 24, second reagent receptacle unit 5, and second reagent receptacles 25 are kept at a given temperature by a cold storage mechanism 17. Consequently, the first reagent held in the first reagent receptacles 24 and the second reagent held in the second reagent receptacles 25 are maintained at given low temperatures. The configurations of the first reagent carrier unit 4 and second reagent carrier unit 5 will be described in greater detail later.

The reaction turntable 6 is arranged among the dilution turntable 3, first reagent receptacle carrier unit 4, and second reagent carrier unit 5. A plurality of reaction receptacles 26 is held and carried on the reaction turntable 6 and arranged circumferentially of the turntable 6. The diluted analyte sampled from a selected one of the dilution receptacles 23 on the dilution turntable 3, the first reagent sampled from a selected one of the first reagent receptacles 24 in the first reagent carrier unit 4, and the second reagent sampled from a selected one of the second reagent receptacles 25 in the second reagent carrier unit 5 are injected into a selected one of the reaction receptacles 26. In the reaction receptacle 26, the diluted analyte, the first reagent, and the second reagent are stirred together, thus inducing a reaction.

The sample diluting pipette 7 is disposed close both to the sample turntable 2 and to the dilution turntable 3. The sample diluting pipette 7 is supported in such a way that it can be moved axially of the sample turntable 2 and of the dilution turntable 3 (e.g., in an up and down direction) by a dilution pipette driving mechanism (not shown) and that the pipette 7 can be rotated along a horizontal direction almost parallel to the openings in the sample turntable 2 and in the dilution turntable 3 by the dilution pipette driving mechanism. As the sample diluting pipette 7 rotates along the horizontal direction, it reciprocates between the sample turntable 2 and the dilution turntable 3. During this reciprocative movement between the turntables 2 and 3, the sample diluting pipette 7 passes through a cleaner in a manner not illustrated.

The operation of the sample diluting pipette 7 is now described. When the pipette 7 moves into position above the opening of the sample turntable 2, the pipette 7 descends axially of the sample turntable 2 and inserts a probe into a selected one of the analyte receptacles 21. At this time, a sample pump (not shown) is operated to cause the sample diluting pipette 7 to draw in a given amount of analyte from the analyte receptacle 21. Then, the sample diluting pipette 7 ascends axially of the sample turntable 2, and the probe is taken out from within the analyte receptacle 21. The sample diluting pipette 7 horizontally rotates into position above the opening of the dilution turntable 3.

Then, the sample diluting pipette 7 descends axially of the dilution turntable 3 and is inserted into the dilution receptacle 23. The diluting pipette 7 delivers the drawn analyte and a given amount of diluent (e.g., physiological salt solution) supplied from the pipette 7 itself into the dilution receptacle 23. As a result, the analyte is diluted within the dilution receptacle 23 by a given dilution factor, thus giving an ultimate concentration of analyte. Then, the sample diluting pipette 7 is cleaned with the cleaner.

The sampling pipette 8 is disposed between the dilution turntable 3 and the reaction turntable 6. The sampling pipette 8 is supported such that it can be moved and rotated axially (in the up and down direction) of the dilution turntable 3 and horizontally by a sampling pipette driving mechanism (not shown), in the same manner as for the sample diluting pipette 7. The sampling pipette 8 reciprocates between the dilution turntable 3 and the reaction turntable 6.

The sampling pipette 8 inserts a probe into the dilution receptacle 23 on the dilution turntable 3 and draws in a given amount of diluted analyte. The sampling pipette 8 dispenses the drawn diluted analyte into a selected one of the reaction receptacles 26 on the reaction turntable 6.

The first reagent pipette 12 is located between the reaction turntable 6 and the first reagent receptacle carrier unit 4. The second reagent pipette 13 is positioned between the reaction turntable 6 and the second reagent receptacle carrier unit 5. The first reagent pipette 12 is so supported that it can be moved and rotated axially (in the up and down direction) of the reaction turntable 6 and in the horizontal direction by a first reagent pipette driving mechanism (not shown). The first reagent pipette 12 reciprocates between the first reagent receptacle carrier unit 4 and the reaction turntable 6.

The first reagent pipette 12 inserts its probe into a selected one of the first reagent receptacles 24 of the first reagent receptacle carrier unit 4 and draws in a given amount of first reagent. Then, the first reagent pipette 12 dispenses the aspirated first reagent into the reaction receptacle 26 on the reaction turntable 6.

The second reagent pipette 13 is so supported that it can be moved and rotated axially (in the up and down direction) of the reaction turntable 6 and in the horizontal direction by a second reagent pipette driving mechanism (not shown) in the same way as for the first reagent pipette 12. The second reagent pipette 13 reciprocates between the second reagent receptacle carrier unit 5 and the reaction turntable 6.

The second reagent pipette 13 inserts its probe into a selected one of the second reagent receptacles 25 in the second reagent carrier unit 5 and aspirates a given amount of second reagent. The second reagent pipette 13 dispenses the aspirated second reagent into the reaction receptacle 26 on the reaction turntable 6.

The dilution stirrer 9 and the dilution receptacle cleaner 11 are arranged around the dilution turntable 3. The dilution stirrer 9 inserts a stirring element (not shown) into the dilution receptacle 23 and stirs together the analyte and the diluent.

The dilution receptacle cleaner 11 is a device for cleaning the dilution receptacle 23 after the diluted analyte has been drawn in by the sampling pipette 8. The dilution receptacle cleaner 11 has a plurality of diluent receptacle cleaning nozzles which are connected with a waste liquid pump (not shown) and with a detergent pump (not shown). The dilution receptacle cleaner 11 inserts the diluent receptacle cleaning nozzles into the dilution receptacle 23 and draws in the diluted analyte left in the dilution receptacle 23 through the inserted cleaning nozzles by operating the waste liquid pump. Then, the dilution receptacle cleaner 11 discharges the aspirated diluted analyte into a liquid waste reservoir (not shown).

Then, the dilution receptacle cleaner 11 supplies a detergent into the dilution receptacle cleaning nozzles from the detergent pump and dispenses the detergent into the dilution receptacle 23 from the cleaning nozzles, thus cleaning the inside of the dilution receptacle 23. The dilution receptacle cleaner 11 then draws in the detergent by means of the dilution receptacle cleaning nozzles and dries the inside of the dilution receptacle 23.

The first reaction stirrer 14, second reaction stirrer 15, and reaction receptacle cleaner 18 are arranged around the reaction turntable 6. The first reaction stirrer 14 inserts a stirring element (not shown) into a selected one of the reaction receptacles 26 and stirs together the diluted analyte and the first reagent. This assures that the diluted analyte and the first reagent react with each other uniformly and quickly. The first reaction stirrer 14 is identical in configuration to the dilution stirrer 9 and so a description thereof is omitted here.

The second reaction stirrer 15 inserts a stirring element (not shown) into the reaction receptacle 26 and stirs together the diluted analyte, first reagent, and second reagent. Consequently, the diluted analyte, first reagent, and second reagent react with each other uniformly and quickly. Since the second reaction stirrer 15 is identical in configuration to the dilution stirrer 9, a description thereof is omitted here.

The reaction receptacle cleaner 18 is a device for cleaning the inside of the reaction receptacle 26 for which an inspection is complete. The cleaner 18 has a plurality of reaction receptacle cleaning nozzles which are connected with a liquid waste pump (not shown) and with a detergent pump (not shown) in the same way as for the dilution receptacle cleaning nozzles. The cleaning step done by the reaction receptacle cleaner 18 is similar to the above-described step performed by the dilution receptacle cleaner 11 and so a description thereof is omitted here.

The multi-wavelength photometer 16 is located opposite to the outer peripheral wall of the reaction turntable 6. The multi-wavelength photometer 16 performs an optical measurement on the diluted analyte which has been injected in the reaction receptacle 26 and which has reacted with the first and second reagents, outputs numerical data indicative of the absorbances of the amounts of various components of the analyte, and detects the reaction state of the diluted analyte.

A thermostat bath (not shown) is disposed around the reaction turntable 6 and configured to invariably maintain constant the temperature of the reaction receptacles 26 installed on the reaction turntable 6.

1-2. Configurations of Receptacle Carrier Units

The configurations of the first reagent carrier unit 4 and second reagent carrier unit 5 which are examples of receptacle carrier unit are next described in detail by referring to FIGS. 2-5.

The first reagent receptacle carrier unit 4 and the second reagent receptacle carrier unit 5 are identical in configuration and so the first reagent receptacle carrier unit 4 will hereinafter be referred to simply as the receptacle carrier unit 4. The first reagent receptacles 24 will be referred to simply as the reagent receptacles 24.

Figure 2:
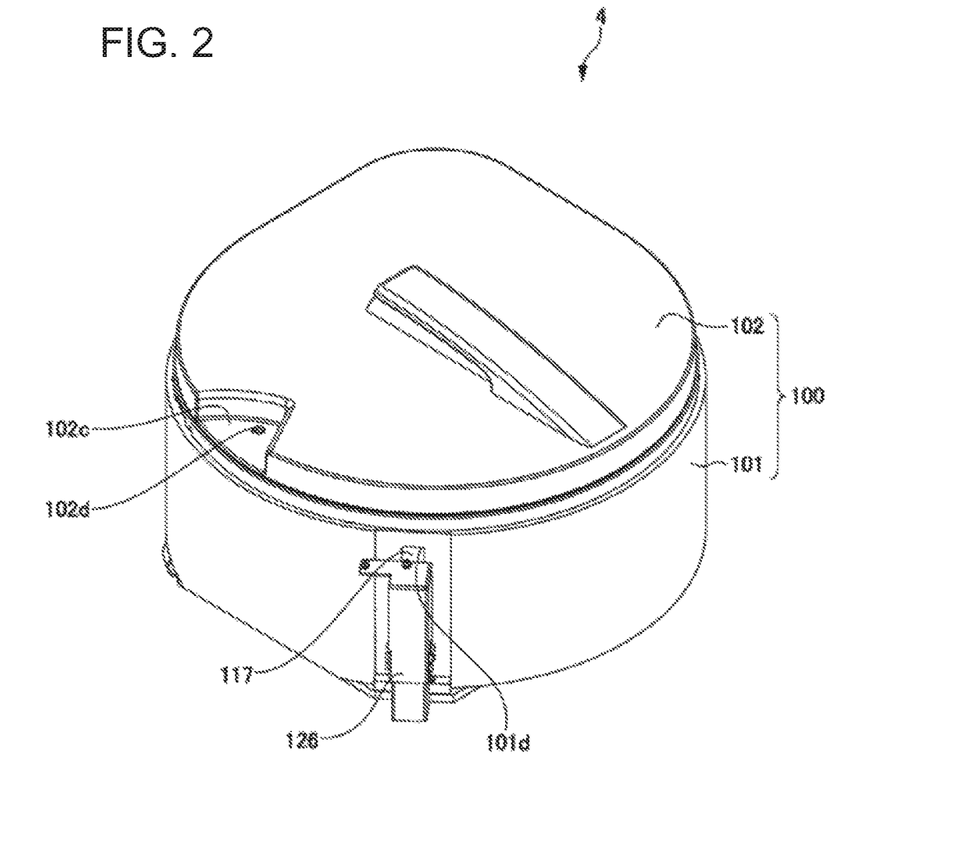
FIG. 2 is a perspective view of a receptacle carrier unit associated with one embodiment of the present invention.
Figure 3:
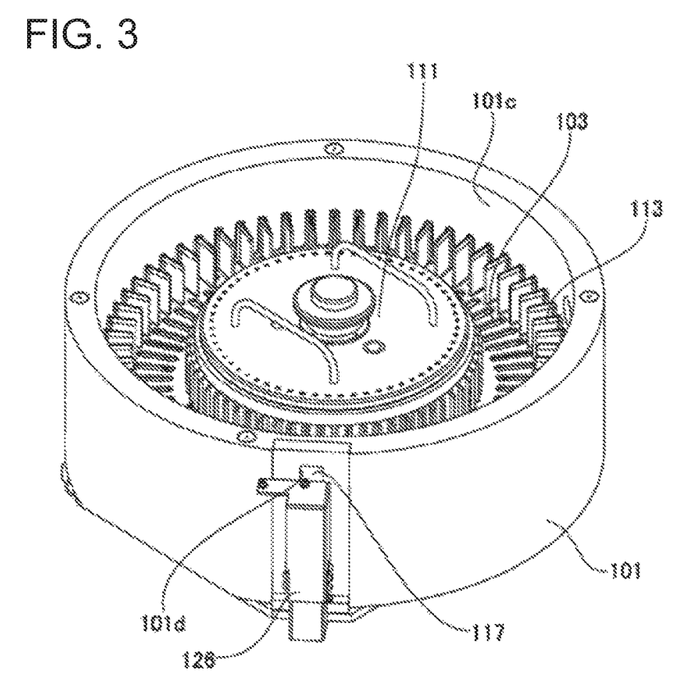
FIG. 3 is a perspective view illustrating a state in which the cover of the receptacle carrier unit of FIG. 2 has been taken off.
Figure 4:
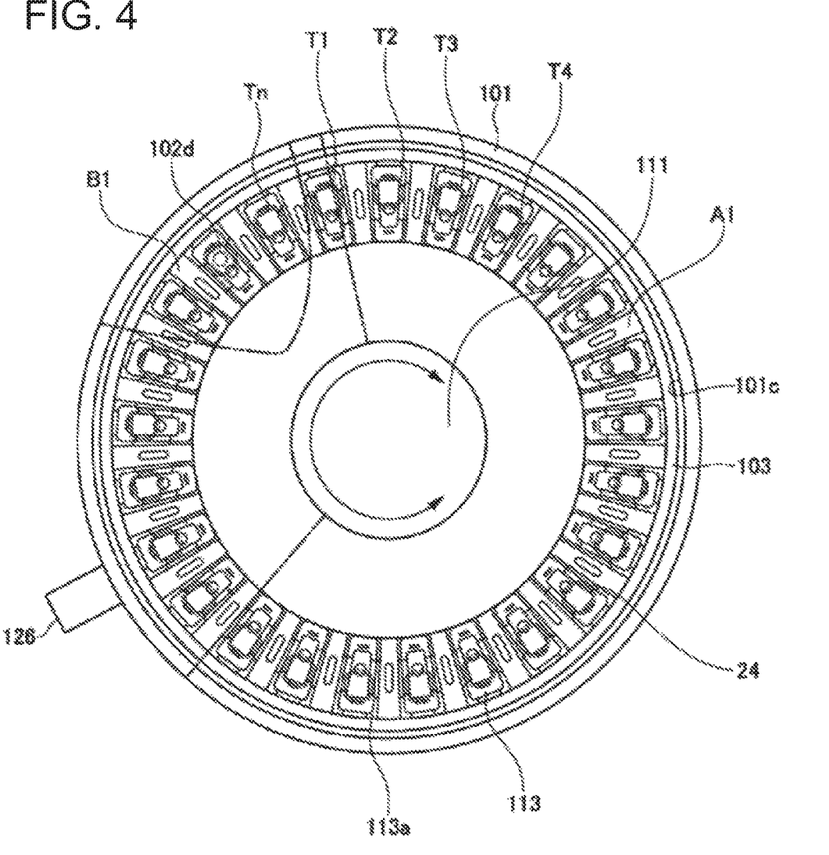
FIG. 4 is a plan view of an enclosure for the receptacle carrier unit shown in FIGS. 2 and 3.
Figure 5:
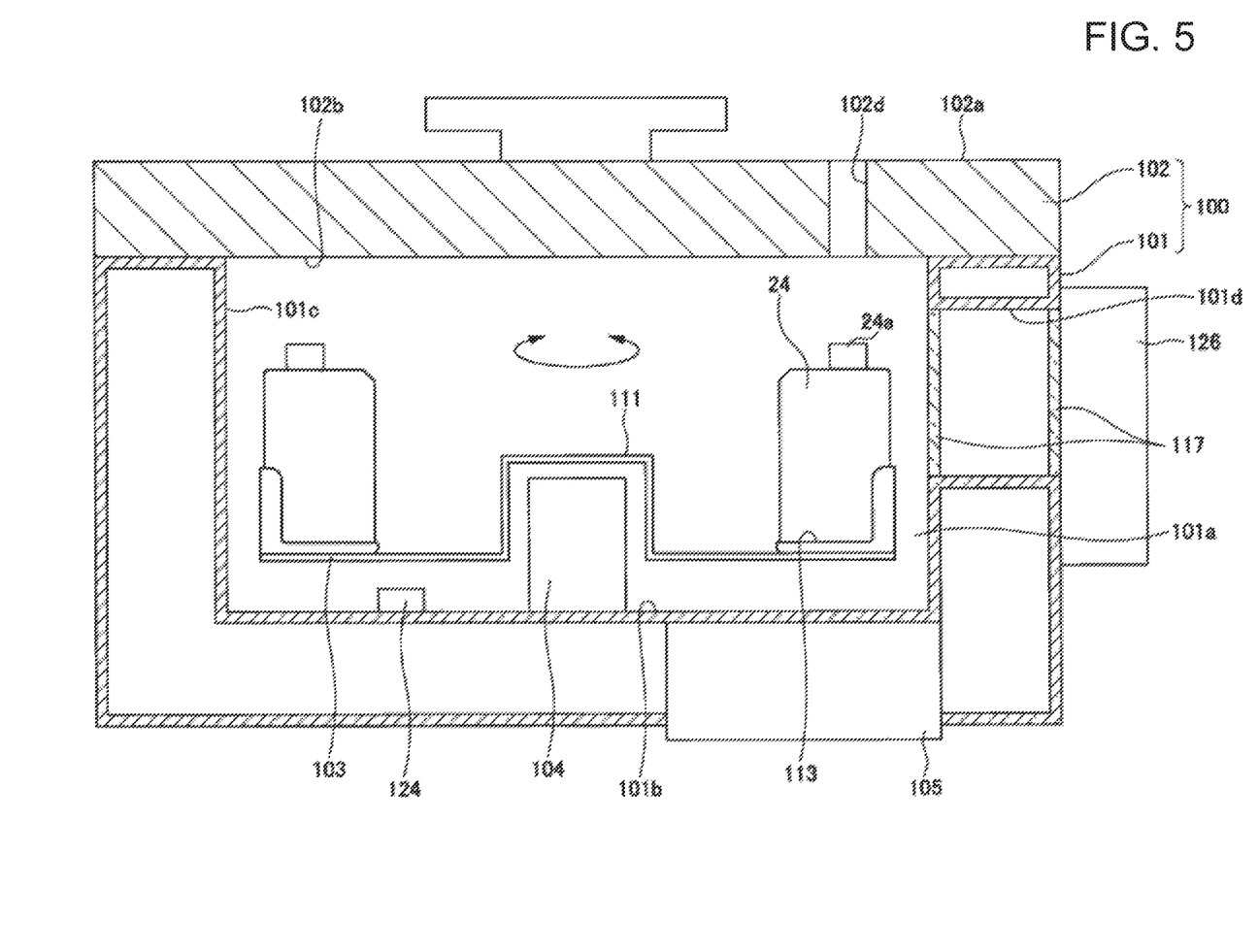
FIG. 5 is a cross-sectional view of the receptacle carrier unit shown in FIGS. 2-4.

FIG. 2 is a perspective view of the receptacle carrier unit 4. FIG. 3 is a perspective view similar to FIG. 2, but in which a cover 102 (described later) has been taken off. FIG. 4 is a plan view of the receptacle carrier unit 4. FIG. 5 is a cross-sectional view of the receptacle carrier unit 4.

As shown in FIGS. 2-5, the receptacle carrier unit 4 is configured including a cool box 100, a turntable 103, a turntable drive 104, a cooling portion 105, a temperature-measuring unit 124, and a reading portion 126 consisting of a barcode reader. The cool box 100 has an enclosure 101 shaped like a container and the cover 102 closing off the opening of the enclosure.

The enclosure 101 is shaped like a cylinder whose one surface is open, the other surface being closed. The turntable 103 and the turntable drive 104 are placed in the inner space 101a of the enclosure 101. The enclosure 101 has a sidewall 101c provided with a transmissive window 101d that extends fully through the sidewall 101c from its inner surface to its outer surface. A transmissive glass 117 that transmits light exiting from the reading portion 126 is fitted in the transmissive window 101d. A heater (not shown) serving as a defogger is mounted on the transmissive glass 117.

The reading portion 126 is mounted on the enclosure 101 and located opposite to the outer surface of the transmissive window 101d. The reading portion 126 reads the barcode formed on each reagent receptacle 24. The reading portion 126 outputs read information concerning the reagent receptacle 24 to the controller 40 (described later).

The cover 102 is shaped cylindrically and made of a heat insulating material. The cover 102 has a substantially circular top surface portion 102a and a bottom surface portion 102b that is opposite to the top surface portion 102a and closes off the opening of the enclosure 101. The top surface portion 102a is formed with a recess 102c that permits passage of the probe of the first reagent pipette 12 which draws in a reagent. The recess 102c for probe passage is formed by cutting out an arc-shaped portion from the top surface portion 102a.

A probe insertion hole 102d into which the probe is inserted is formed in the recess 102c for probe insertion. The probe insertion hole 102d extends vertically fully from the bottom surface portion of the recess 102c to the bottom surface portion 102b of the cover 102. The probe insertion hole 102d is in communication with the inner space 101a of the enclosure 101.

As shown in FIGS. 4 and 5, the turntable 103 is accommodated in the inner space 101a of the enclosure 101. The turntable 103 is shaped like a disk. A bearing 111 is mounted in a radially central portion of the turntable 103. The bearing 111 is rotatably supported to the turntable drive 104 mounted to a bottom surface portion 101b of the enclosure 101. The turntable 103 is rotated in given angular steps circumferentially by the turntable drive 104 or rotated forwardly or rearwardly circumferentially of the turntable 103 at a given speed for a given time. The turntable 103 is shaped in a form that exhibits point symmetry about the bearing 111.

The turntable 103 has a plurality of receiver portions 113 which are arranged circumferentially of the turntable 103 at given angular intervals. Each receiver portion 113 has a holding frame 113a provided with a substantially square opening that conforms in shape with the bottom surface portion of each reagent receptacle 24. The holding frame 113a protrudes upwardly from the bottom surface portion of the turntable 103 in the up and down direction and holds the reagent receptacle 24.

The reagent receptacle 24 has an opening 24a into which the probe of the first reagent pipette 12 is inserted. The reagent receptacle 24 is held to the holding frame 113a of respective one of the receiver portions 113 of the turntable 103 such that the receptacle opening 24a faces the opening of the enclosure 101. When the turntable 103 rotates, the reagent receptacle 24 rotates with it because the receptacle 24 is accommodated and carried in the turntable 103.

As shown in FIG. 5, the cooling portion 105 is mounted to the bottom surface portion 101b of the enclosure 101 and connected to the cold storage mechanism 17 (see FIG. 1). The cooling portion 105 is a cooling device using a Peltier device, for example. One side (cool side) of the Peltier device of the cooling portion 105 is in contact with the inner side of the sidewall 101c of the enclosure 101, the other side (hot side) being placed outside the inner space 101a of the enclosure 101. By electrically energizing the Peltier device, the cool side of the Peltier device in contact with the sidewall 101c of the enclosure 101 absorbs heat. The absorbed heat is transferred to the hot side. Consequently, the cool side of the Peltier device is cooled. The inner side of the sidewall 101c in contact with the cool side of the Peltier device is also cooled.

The cooling portion 105 is not restricted to a cooling device using a Peltier device. For example, a device where pipes through which cooling water is circulated are arranged in the sidewall and in the bottom surface portion 101b of the enclosure 101 may also be utilized. Various other kinds of cooling device may also be used.

The temperature-measuring unit 124 is positioned, for example, on the bottom surface portion 101b of the inner space 101a of the enclosure 101 and operates to measure the temperature in the inner space 101a of the enclosure 101. In this example, the temperature-measuring unit 124 is installed on the bottom surface portion 101b. The manner in which the temperature-measuring unit is installed is not restricted to this example. For example, the temperature-measuring unit 124 may be installed on the side surface of the inner space 101a, on the bottom surface portion 102b of the cover 102, or on the turntable 103.

As described above, the enclosure 101 is provided with the transmissive window 101d, and the cover 102 has the probe insertion hole 102d. The transmissive glass 117 is fitted in the transmissive window 101d to permit passage of light from the reading portion 126. The heater is mounted to prevent the transmissive glass 117 from becoming fogged.

As shown in FIG. 4, the inner space 101a of the enclosure 101 has a second region B1 and a first region A1. The first region A1 is remote from the transmissive window 101d, reading portion 126, and probe insertion hole 102d. The transmissive window 101d, reading portion 126, and probe insertion hole 102d are arranged in the second region B1. Therefore, air in the somewhat instrumented second region B1 is less easily cooled than air in the first region A1. As a result, if a so-called wait time in which no aliquot dispensing is done is prolonged, there occurs a temperature difference between the first region A1 and the second region B1 of the inner space 101a.

Temperature distribution information indicative of the degree of ease with which each reagent receptacle 24 can be warmed or cooled is different among different installation locations T1, T2, T3, T4, . . . , Tn of the reagent receptacles 24 in the inner space 101a.

1-3. Configuration of Control System

Figure 6:
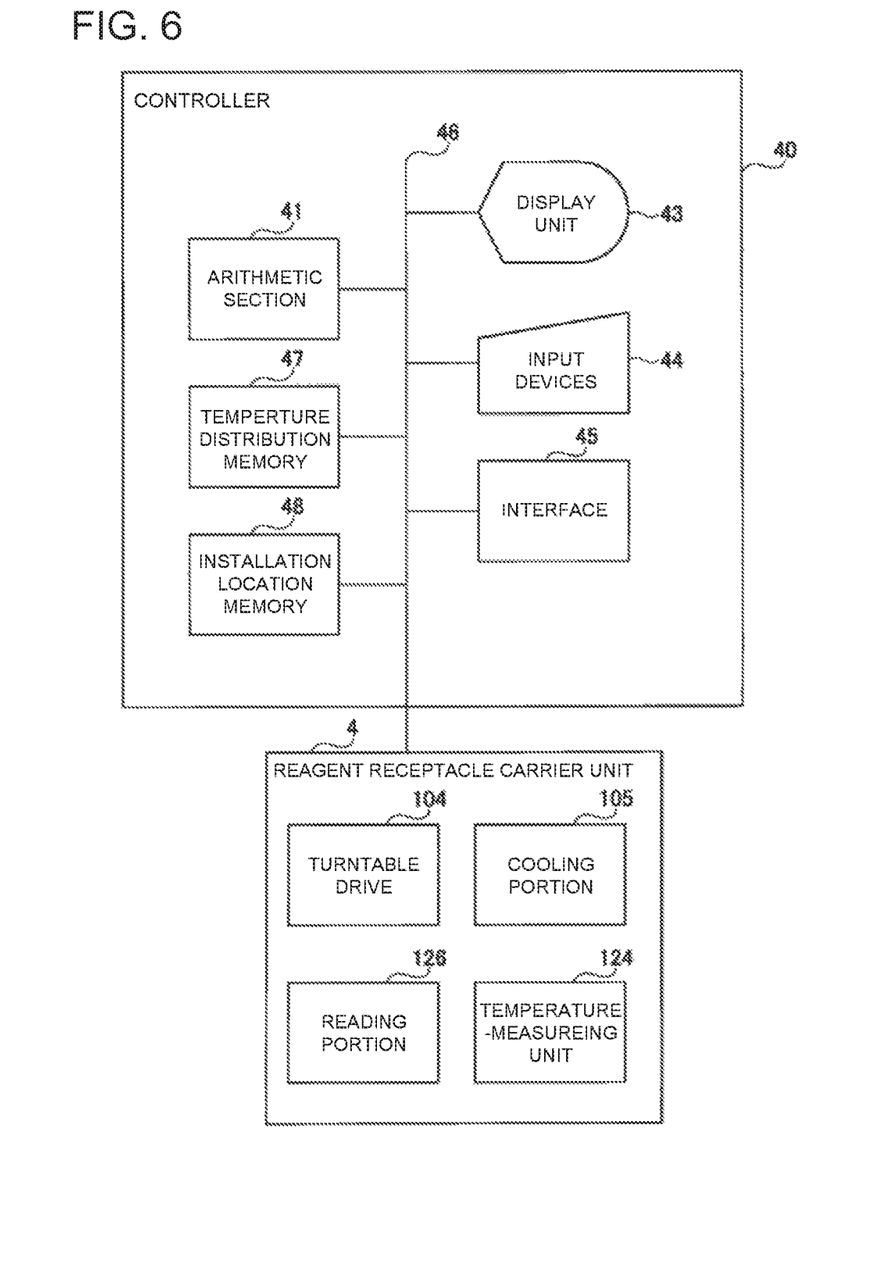
FIG. 6 is a block diagram of a control system included in an automated analyzer associated with one embodiment of the present invention.

The configuration of the control system of the biochemical analyzer 1 is next described by referring to FIG. 6, which is a block diagram of the control system of the biochemical analyzer 1.

As shown in FIG. 6, the biochemical analyzer 1 has the controller 40 for controlling the whole instrument. The controller 40 being one example of control section and the receptacle carrier unit 4 are interconnected via a system bus 46. The controller 40 has an arithmetic section 41, a display unit 43, input devices 44, an interface 45, a temperature distribution memory 47, and an installation location memory 48. The arithmetic section 41, display unit 43, input devices 44, interface 45, temperature distribution memory 47, and installation location memory 48 are interconnected by the system bus 46.

The arithmetic section 41 is made of a CPU (central processing unit), an MPU (microprocessing unit), or the like and controls the operations of various portions of the biochemical analyzer 1. The arithmetic section 41 reads programs from a memory (not shown) and controls the operations of various portions of the biochemical analyzer 1. Furthermore, the arithmetic section 41 controls the operations of the turntable drive 104 in the receptacle carrier unit 4 and of the cooling portion 105, based on the temperature distribution information stored in the temperature distribution memory 47 and on the installation location information about the reagent receptacles 24 stored in the installation location memory 48 as described in further detail later.

The arithmetic section 41 acquires various measurement data through the interface 45. One example of the measurement data is absorbance measured by the multi-wavelength photometer 16 (see FIG. 1).

The display unit 43 displays various information including the results of measurements on the mixture liquid of diluted reagent, first reagent, and second reagent and the installation location information about the reagent receptacles 24 accommodated in the receptacle carrier unit 4. For example, a liquid crystal display or the like is used as the display unit 43.

The input devices 44 generate an input signal in response to a user's input action on the biochemical analyzer 1 and output the input signal to the arithmetic section 41. A mouse, a keyboard, a touch panel, and so on are used as the input devices 44.

Temperature distribution information on each of the installation locations T1, T2, T3, . . . , Tn obtained by previously measuring the temperature in the inner space 101a of the cool box 100 is stored in the temperature distribution memory 47. The temperature distribution information $Ki$ on each installation location stored in the temperature distribution memory 47 is computed, for example, from the following Eq. (1):

$$Ki = \Delta Ti / \Sigma Ti \qquad (1)$$

where $\Delta Ti$ is a temperature variation occurring at an installation location during a given time and $\Sigma Ti$ is a total temperature variation in the internal space 101a.

Installation location information related to the installation locations T1, T2, T3, . . . , Tn and generated when the reagent receptacles 24 are placed in the cool box 100 is stored in the installation location memory 48. This installation location information may be entered by the user through the input devices 44. Alternatively, installation location information may be calculated from information read by the reading portion 126.

2. Example of Operation of Biochemical Analyzer

Figure 7:
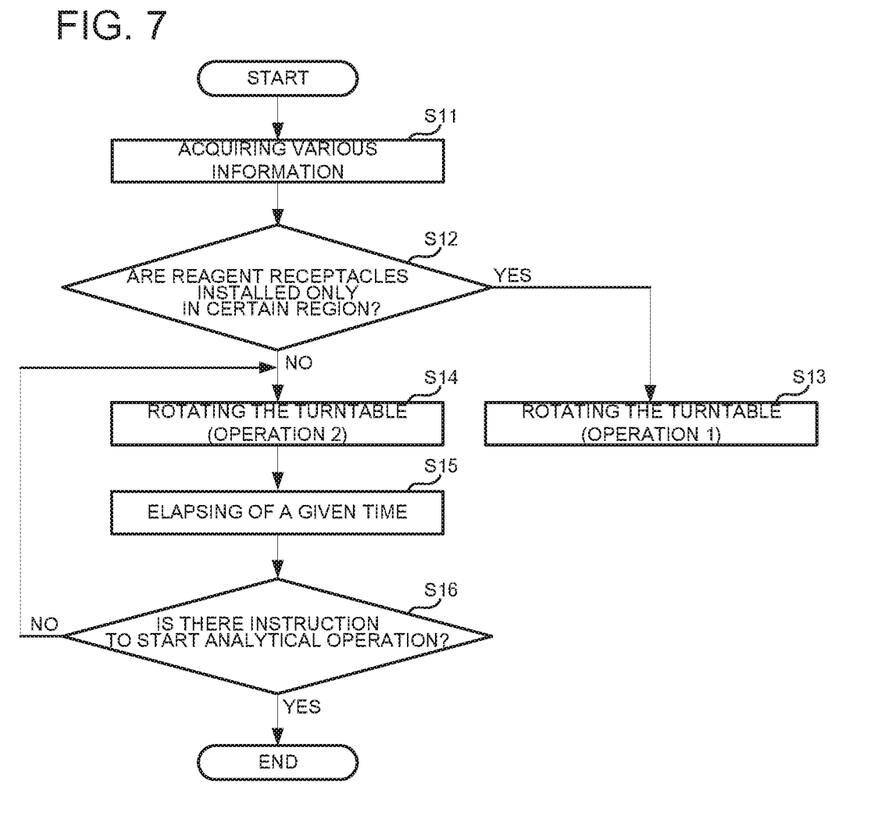
FIG. 7 is a flowchart illustrating a sequence of operations on the receptacle carrier unit shown in FIGS. 2-4.

An example of operation of the biochemical analyzer 1 of the above-described configuration is next described by referring to FIG. 7. The operation performed during a wait time that follows completion of an analytical operation of the receptacle carrier unit 4 is now described. FIG. 7 is a flowchart illustrating a sequence of operations of the receptacle carrier unit 4.

As illustrated in FIG. 7, the arithmetic section 41 acquires various information (step S11). The various information contains information about the angular position of the turntable 103 when an aliquot dispensing step has completed, about the kinds and amounts of reagents received in the reagent receptacles 24, and about the installation locations of the reagent receptacles 24 in the cool box 100. The information about the angular position of the turntable 103 is acquired from the turntable drive 104. The information about the kinds and amounts of reagents is obtained from the reading portion 126. The information about the installation locations of the reagent receptacles 24 is derived from the installation location memory 48. In step S11, the arithmetic section 41 obtains the temperature distribution information $Ki$ on each installation location from the temperature distribution memory 47.

Then, the arithmetic section 41 makes a decision from the installation location information as to whether the reagent receptacles 24 are installed only in a certain region (step S12). If the decision at step S12 is affirmative (YES), indicating that the number of reagent receptacles installed in the cool box 100 is small enough so that they can rest within the first region A1 shown in FIG. 4, the arithmetic section 41 drives the turntable drive 104 to perform operation 1 of the turntable 103 (step S13). Consequently, the operation to be performed during the wait time is completed by the receptacle carrier unit 4.

Operation 1 in step S13 is to rotate the turntable 103 such that the plural reagent receptacles 24 are within the first region A1 of the internal space 101a of the cool box 100. Thus, the plural reagent receptacles 24 are stored in the first region A1 of the cool box 100 which can be cooled with greater ease than the second region B1 and which is remote from the transmissive window 101d, reading portion 126, and probe insertion hole 102d. As a result, deterioration of the reagents received in the reagent receptacles 24 can be reduced.

If the decision at step S12 is negative (NO), indicating that the arithmetic section 41 has determined that the plural reagent receptacles 24 are not within the confines of the first region A1, the arithmetic section 41 drives the turntable drive 104 to perform operation 2 of the turntable 103 (step S14).

Operation 2 at step S14 is that the arithmetic section 41 first calculates a provisional installation time during which each reagent receptacle 24 stays within the wait time at each installation location, based on the temperature distribution information $Ki$ on each installation location, the information $Ki$ being obtained from the temperature distribution memory 47. The provisional installation time $ti$ is computed, for example, from the following Eq. (2):

$$ti = Ki \times T / N \qquad (2)$$

where $Ki$ is the temperature distribution information on each installation location, T is the wait time, and N is the number of reagent receptacles 24.

The provisional installation time $ti$ calculated from Eq. (2) is computed for each of the installation locations T1, T2, T3, T4, . . . , Tn. The arithmetic section 41 drives the turntable drive 104 based on each calculated provisional installation time $ti$ to rotate the turntable 103.

Consequently, the plural reagent receptacles 24 are put in storage in such a way that the period of time during which each receptacle 24 is kept in the first region A1 of relatively low temperature in the inner space 101a and the period of time during which each receptacle 24 is kept in the second region B1 of relatively high temperature are made uniform. As a result, the installation conditions for the reagent receptacles 24 can be made uniform. That is, the amount of heat (effects) that each reagent receptacle 24 receives from the cool box 100 when the wait time T has passed can be made uniform for all of these receptacles 24. Hence, nonuniformities in temperature among the reagents received in the reagent receptacles 24 can be alleviated.

Furthermore, it is possible to prevent the reagent receptacles 24 from being prolongedly kept in storage in the second region B1 that is higher in temperature than the first region A1 and, therefore, deterioration of the reagents accommodated in the reagent receptacles 24 can be reduced.

In operation 1 at step S13 and operation 2 at step S14, the arithmetic section 41 calculates installation locations and provisional installation times which minimize and homogenize the amounts of heat that the individual reagent receptacles 24 receive from the cool box 100 on the basis of the temperature distribution information Ki. Consequently, in the operation 1, the reagent receptacles 24 can be kept in storage at lowest-temperature, installation locations within the first region A1 that is lower in temperature than the second region B1. In the operation 2, the effects of the cool box 100 on the reagent receptacles 24 can be reduced to a minimum. Therefore, deterioration of the reagents held in the reagent receptacles 24 can be reduced more effectively.

If a given time elapses since the completion of step S14 (step S15), the arithmetic section 41 makes a decision as to whether there is an instruction to start an analytical operation (step S16). For example, the given time in step S15 is a given time taken to calculate the temperature distribution information Ki.

If the decision at step S16 is NO, indicating that the arithmetic section 41 has determined that there is no instruction to start any analytical operation, the arithmetic section 41 returns to step S14, and rotates the turntable 103 such that the reagent receptacles 24 are again placed in uniform installation conditions including the amount of heat undergoing from the cool box 100 and the provisional installation time.

If the decision at step S16 is YES, indicating that the arithmetic section 41 has determined that there is an instruction to start an analytical operation, the arithmetic section 41 ends the operation of the receptacle carrier unit 4 to be conducted during the wait time. In consequence, the operation of the receptacle carrier unit 4 to be conducted during the wait time is completed.

In steps S13 and S14, the provisional installation time ti at each of the installation locations T1, T2, T3, . . . , T4, . . . , Tn may be calculated while taking account also of information about the amounts and kinds of reagents received in the reagent receptacles 24. In this case, temperature variations among the reagents held in the reagent receptacles 24 can be reduced further.

In this way, the biochemical analyzer 1 and receptacle carrier unit 4 of the present embodiment make it possible to homogenize the installation conditions for the reagent receptacles 24 during the wait time from the completion of an analytical operation to the start of a next analytical operation. Consequently, if temperature nonuniformities arise in the air within the inner space 101a of the cool box 100 due to the reading portion 126, probe insertion hole 102d, and other components, the temperature nonuniformities of the reagents accommodated in the reagent receptacles 24 can be reduced. Furthermore, it is not necessary to provide a blower or the like to eliminate temperature nonuniformities within the cool box 100. As a result, the parts count of the receptacle carrier unit 4 can be prevented from increasing.

By controlling the rotational speed of the turntable 103 during the wait time, excessive rotation of the turntable 103 can be prevented; otherwise, the reagents held in the first reagent receptacles 24 would excessively touch the air and deterioration of the reagents would be accelerated.

It is to be understood that the present invention is not restricted to the embodiments described previously and shown in the drawings and that they can be practiced in variously modified forms without departing from the gist of the invention set forth in the accompanying claims.

In the above embodiments, the temperature distribution information Ki about each of the installation locations T1, T2, T3, T4, . . . , Tn in the cool box 100 is previously calculated. The present invention is not restricted to this example. For example, the temperature distribution information Ki about each of the installation locations T1, T2, T3, T4, . . . , Tn may be updated periodically based on temperature information measured by the temperature-measuring unit 124.

Furthermore, in the above embodiments, the turntable drive 104 is controlled by the use of the arithmetic section 41 of the controller 40 that controls the whole biochemical analyzer 1. The present invention is not restricted to this example. For example, a unit controller that controls only the receptacle carrier unit 4 may be provided, and the turntable drive 104 may be controlled by this unit controller.

In the above embodiments, the automated analyzer is a biochemical analyzer for use in analysis of biochemical specimens such as blood and urine. The present invention is not restricted to this example. The automated analyzer may also be an instrument for performing various analyses of water quality, food, and others. Additionally, the automated analyzer may be an immunological analyzer for performing immunological analysis of antigen-antibody reactions of analytes to be examined.

Additionally, in the above embodiments, the reagent carrier unit is designed to accommodate reagent receptacles. The reagent carrier unit is not restricted to this example. Other examples of the reagent carrier unit include: an analyte receptacle carrier unit for accommodating analyte receptacles in which analytes are received; a diluted analyte receptacle carrier unit for accommodating diluted analyte receptacles in which diluted analytes are received; a reaction receptacle carrier unit for accommodating reaction receptacles; and other receptacle carrier units for accommodating various other kinds of receptacles while kept cooled.

The invention claimed is:

1. A receptacle carrier unit comprising:
a turntable having a plurality of receiver portions having respective receptacles received therein under vertical conditions;
a turntable drive by which the turntable is rotatably supported;
a cool box for accommodating the turntable;
a cooling device for cooling an inner space of the cool box; and
a controller for controlling the turntable drive, said controller having a temperature distribution memory in which there is stored temperature distribution information indicative of degree of ease with which each installation location of the cool box for the receptacles is warmed or cooled;
wherein said controller controls the turntable drive based on a number and installation locations of the receptacles installed in the cool box and on the temperature distribution information to homogenize effects that each of the receptacles receive from the cool box, and
wherein said controller calculates provisional installation times taken for said respective receptacles to stay at respective installation locations based on said temperature distribution information about the installation locations and the number of said respective receptacles installed in the cooling box, and controls said turntable drive based on the provisional installation times.

2. A receptacle carrier unit as set forth in claim 1, wherein said cool box has a first region and a second region that is higher in temperature than the first region, and wherein said controller controls said turntable drive based on the number and installation locations of said receptacles such that all of the receptacles lie within the confines of the first region.

3. A receptacle carrier unit as set forth in claim 1, wherein said controller calculates said provisional installation times in such a way that amounts of heat that said receptacles receive from said cool box are minimized and homogenized.

4. An automated analyzer comprising:
- a receptacle carrier unit accommodating a plurality of receptacles under cooled conditions;
- a probe adapted to be inserted into and withdrawn from the receptacles accommodated in the receptacle carrier unit; and
- a controller for controlling the receptacle carrier unit;
- wherein said receptacle carrier unit has a turntable having a plurality of receiver portions capable of receiving the plurality of receptacles under vertical conditions, a turntable drive by which the turntable is rotatably supported, a cool box for accommodating the turntable, and a cooling device for cooling an inner space of the cool box;
- wherein said controller has a temperature distribution memory in which there is stored temperature distribution information indicative of degrees of ease with which installation locations in the cool box for the receptacles are warmed or cooled;
- wherein said controller controls the turntable drive based on a number and installation locations of the receptacles installed in said cool box and on said temperature distribution information to homogenize effects that the receptacles receive from the cool box; and
- wherein said controller calculates provisional installation times taken for said receptacles to stay at respective installation locations based on said temperature distribution information about the installation locations and the number of said receptacles installed in the cooling box, and controls said turntable drive based on the provisional installation times.

\* \* \* \* \*